US012534610B2

(12) United States Patent
Ootsuki et al.

(10) Patent No.: US 12,534,610 B2
(45) Date of Patent: Jan. 27, 2026

(54) HEAT-EXPANDING FIRE RETARDANT

(71) Applicant: SEKISUI CHEMICAL CO., LTD., Osaka (JP)

(72) Inventors: Kenichi Ootsuki, Moriyama (JP); Mika Tsujii, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 261 days.

(21) Appl. No.: 17/638,022

(22) PCT Filed: Jun. 5, 2020

(86) PCT No.: PCT/JP2020/022442
§ 371 (c)(1),
(2) Date: Feb. 24, 2022

(87) PCT Pub. No.: WO2021/039013
PCT Pub. Date: Mar. 4, 2021

(65) Prior Publication Data
US 2022/0275190 A1    Sep. 1, 2022

(30) Foreign Application Priority Data
Aug. 26, 2019 (JP) .................... 2019-154165

(51) Int. Cl.
*C09K 21/02* (2006.01)
*C08L 27/06* (2006.01)
(Continued)

(52) U.S. Cl.
CPC .............. *C08L 27/06* (2013.01); *C09K 21/02* (2013.01); *C09K 21/04* (2013.01); *C09K 21/12* (2013.01)

(58) Field of Classification Search
CPC ...... C08L 23/0853; C08L 27/06; C08L 11/00; C08K 3/016; C08K 3/04; C08K 3/32; C08K 3/26
See application file for complete search history.

(56) References Cited

U.S. PATENT DOCUMENTS 5,232,976 A    8/1993  Horacek et al.
6,124,394 A *  9/2000  Goto ...................... B29C 48/08
                                                       524/495
(Continued)

FOREIGN PATENT DOCUMENTS

CN    110042528 A *  7/2019 ............... D01F 1/07
EP    2 184 320        5/2010
(Continued)

OTHER PUBLICATIONS

CN 109575418 A (Year: Apr. 2019).*
(Continued)

*Primary Examiner* — Joseph D Anthony
(74) *Attorney, Agent, or Firm* — Wenderoth, Lind & Ponack, L.L.P.

(57) ABSTRACT

The present invention relates to a thermally expandable fire resistant material comprising at least one matrix resin selected from the group consisting of a thermoplastic resin and a rubber and a thermally expandable graphite, having an expansion pressure of 3.0 N/cm² or more. According to the present invention, a fire resistant material capable of exhibiting excellent fire resistance can be provided.

5 Claims, 1 Drawing Sheet

(51) Int. Cl.
*C09K 21/04* (2006.01)
*C09K 21/12* (2006.01)

(56) References Cited

U.S. PATENT DOCUMENTS

| | | | | |
|---|---|---|---|---|
| 8,297,013 | B2* | 10/2012 | Ueda | E06B 5/161 |
| | | | | 52/204.5 |
| 8,393,121 | B2* | 3/2013 | Beele | A62C 2/065 |
| | | | | 52/220.8 |
| 2006/0160926 | A1* | 7/2006 | Horacek | H02G 3/0412 |
| | | | | 523/179 |
| 2006/0254164 | A1* | 11/2006 | Ueda | E06B 5/161 |
| | | | | 52/232 |
| 2010/0294519 | A1* | 11/2010 | Beele | F16L 5/04 |
| | | | | 169/45 |
| 2017/0253716 | A1* | 9/2017 | Shimamoto | C08L 23/0853 |

FOREIGN PATENT DOCUMENTS

| | | |
|---|---|---|
| EP | 2 784 260 | 10/2014 |
| JP | 3-503654 | 8/1991 |
| JP | 10-95887 | 4/1998 |
| JP | 2016-164217 | 9/2016 |
| JP | 2017-141463 | 8/2017 |
| JP | 2019-119859 | 7/2019 |
| JP | 2019-131654 | 8/2019 |
| WO | 89/09808 | 10/1989 |

OTHER PUBLICATIONS

CN 103627068 A (Year: Mar. 2014).*
CN 105037911 A (Year: Nov. 2015).*
CN 106710682 A (Year: May 2017).*
CN 106366723 A (Year: Feb. 2017).*
CN 108530846 A (Year: Sep. 2018).*
CN 108774487 A (Year: Nov. 2018).*
CN 108794876 A (Year: Nov. 2018).*
International Search Report (ISR) issued Aug. 18, 2020 International (PCT) Application No. PCT/JP2020/022442.

* cited by examiner

HEAT-EXPANDING FIRE RETARDANT

TECHNICAL FIELD

The present invention relates to a thermally expandable fire resistant material containing thermally expandable graphite.

BACKGROUND ART

In an architecture field, fire resistant materials are used for building materials such as fittings, pillars and wall materials. As fire resistant materials, thermally expandable fire resistant materials made of resin containing thermally expandable graphite in addition to fire retardant and inorganic filler are used (for example, refer to PTL1). Such a thermally expandable fire resistant material expands by heating and allows a fire resistant thermally insulating layer to be formed from combustion residue, so that fire resistant thermal insulation performance is exhibited.

A thermally expandable fire resistant material containing thermally expandable graphite is installed, for example, in a gap between a fitting installed at an opening of a building such as a door and a window and a frame such as a door frame and a window frame that surrounds the fitting. In case of fire, the sheet expands in the thickness direction to block the gap between the fitting and frame material, so that spread of fire can be prevented.

CITATION LIST

Patent Literature

PTL1: JP 2017-141463 A

SUMMARY OF INVENTION

Technical Problem

However, it has been found that even with use of a thermally expandable fire resistant material containing thermally expandable graphite, the fire resistant material flakes off after a long period in case of fire, so that the gap between a fitting and a frame is hardly blocked in some cases.

Accordingly, an object of the present invention is to provide a thermally expandable fire resistant material excellent in fire resistance, which hardly flakes off.

Solution to Problem

Through extensive study, the present inventor has found that the problem can be solved by a thermally expandable fire resistant material containing at least one matrix resin selected from the group consisting of a thermoplastic resin and a rubber and a thermally expandable graphite, having an expansion pressure over a certain level.

It has been also found that the problem can be solved by a thermally expandable fire resistant material containing an ethylene-vinyl acetate copolymer having a specific structure as the thermoplastic resin and a thermally expandable graphite.

Further, it has been also found that the problem can be solved by a fire resistant material containing an ethylene-vinyl acetate copolymer as the thermoplastic resin, a thermally expandable graphite, and a crosslinking agent.

In other words, the present invention relates to the following items [1] to [15].

[1] A thermally expandable fire resistant material containing at least one matrix resin selected from the group consisting of a thermoplastic resin and a rubber and a thermally expandable graphite, and having an expansion pressure of 3.0 N/cm$^2$ or more.

[2] The thermally expandable fire resistant material according to item [1], wherein the thermally expandable graphite content is 20 to 500 parts by mass relative to 100 parts by mass of the matrix resin.

[3] The thermally expandable fire resistant material according to item [1] or [2], further containing a flame retardant.

[4] The thermally expandable fire resistant material according to any one of items [1] to [3], wherein the thermoplastic resin is an ethylene-vinyl acetate copolymer or a polyvinyl chloride based resin.

[5] The thermally expandable fire resistant material according to any one of items [1] to [4], wherein the rubber contains a chloroprene rubber.

[6] The thermally expandable fire resistant material according to item [4], wherein the ethylene-vinyl acetate copolymer contains a low-MFR component having a melt flow rate (MFR) at 190° C. of 8.0 g/10 min or less.

[7] The thermally expandable fire resistant material according to item [4] or [6], wherein the ethylene-vinyl acetate copolymer contains a high-Vac component having a vinyl acetate content of 20 mass % or more.

[8] The thermally expandable fire resistant material according to any one of items [1] to [7], further containing a crosslinking agent.

[9] The thermally expandable fire resistant material according to item [4], wherein the thermoplastic resin is a polyvinyl chloride based resin.

[10] The thermally expandable fire resistant material according to item [9], further containing a plasticizer.

[11] The thermally expandable fire resistant material according to item [10], wherein the plasticizer contains a solid plasticizer.

[12] The thermally expandable fire resistant material according to item [11], wherein the plasticizer contains a liquid plasticizer, with a mass ratio of the liquid plasticizer to the solid plasticizer (liquid plasticizer/solid plasticizer) of 5/95 to 60/40.

[13] A thermally expandable fire resistant material containing an ethylene-vinyl acetate copolymer and a thermally expandable graphite, the ethylene-vinyl acetate copolymer containing a low-MFR component having a melt flow rate (MFR) at 190° C. of 8.0 g/10 min or less.

[14] A thermally expandable fire resistant material containing an ethylene-vinyl acetate copolymer and a thermally expandable graphite, the ethylene-vinyl acetate copolymer containing a high-Vac component having a vinyl acetate content of 20 mass % or more.

[15] A thermally expandable fire resistant material containing an ethylene-vinyl acetate copolymer and a thermally expandable graphite, further containing a crosslinking agent.

Advantageous Effects of Invention

According to the present invention, a thermally expandable fire resistant material excellent in fire resistance, which hardly flakes off, can be provided.

DESCRIPTION OF EMBODIMENT

[Thermally Expandable Fire Resistant Material]

Figure 1:
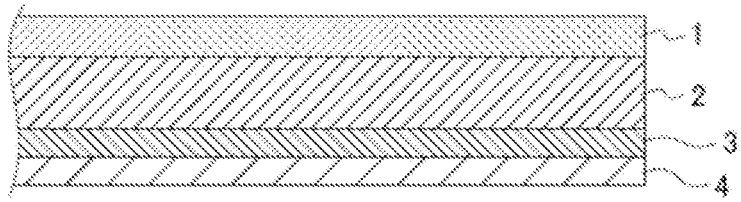
FIG. 1 is a schematic cross-sectional view showing a fire resistant multilayer sheet in an embodiment.

A thermally expandable fire resistant material of the present invention is a fire resistant material containing at least one matrix resin selected from the group consisting of a thermoplastic resin and a rubber and a thermally expandable graphite, having an expansion pressure of 3.0 N/cm$^2$ or more. In the following, the thermally expandable fire resistant material of the present invention is simply referred to as a fire resistant material in some cases.

(Expansion pressure)

The fire resistant material of the present invention has an expansion pressure of 3.0 N/cm$^2$ or more. With an expansion pressure of a fire resistant material of less than 3.0 N/cm$^2$, the fire resistant material exposed to flame for a long period in case of fire causes reduction in fire resistance, allowing the force for blocking the gap of fittings to be reduced or allowing the fire resistant material to flake off from the fittings.

From the viewpoint of improving the fire resistance, the expansion pressure of a thermally expandable fire resistant material is preferably 5.0 N/cm$^2$ or more, more preferably 7.0 N/cm$^2$ or more, and still more preferably 9.0 N/cm$^2$ or more. The higher the expansion pressure of the thermally expandable fire resistant material is, the better it is. However, the expansion pressure is practically 20 N/cm$^2$ or less.

The expansion pressure of a fire resistant material may be adjusted by the amount of the thermally expandable graphite added, the type of the thermoplastic resin and rubber, the presence of a crosslinking agent used, etc., which are described below.

It is presumed that the reason why the expansion pressure of the thermally expandable fire resistant material of the present invention increases is due to reduction in flowability of the fire resistant material at high temperature resulting from carbonization of a part of the fire resistant material in case of fire through appropriate adjustment of selection of the types of the thermoplastic resin and rubber, the presence or absence of a crosslinking agent used, etc., while using a thermally expandable graphite, though not being clear.

The expansion pressure in the present invention is an expansion pressure at 500° C., which is measured as follows.

(1) A sheet-like fire resistant material having a thickness of 1.8 mm, a width of 25 mm, and a length of 25 mm is prepared.
(2) A hot plate is prepared, and a force gauge is installed at a position 1.2 cm away from the surface of a hot plate.
(3) The surface of the hot plate is heated to 500° C., and the sheet-like fire resistant material is placed on the hot plate surface. Further, a plate of ceramic (material: calcium silicate, thickness: 2 mm, width: 30 mm, length: 30 mm) is disposed on the fire resistant material.
(4) When the fire resistant material is heated at 500° C. on the hot plate for 250 seconds, the maximum stress measured by a force gauge is divided by the area of a jig to define the expansion pressure.

The expansion ratio of the fire resistant material of the present invention is preferably 10 to 500 times, more preferably 50 to 300 times, and still more preferably 100 to 250 times from the viewpoint of improving fire resistance, though not particularly limited.

The expansion ratio may be obtained as follows. A sheet-like fire resistant material having a thickness of 1.8 mm, a width of 25 mm, and a length of 25 mm is heated at 600° C. for 30 minutes, and the thickness of the fire resistant material after heating is divided by the thickness of the fire resistant material before heating.

(Thermally Expandable Graphite)

The fire resistant material of the present invention contains a thermally expandable graphite. The thermally expandable graphite is a known material that expands when heated, including a graphite intercalation compound produced by acid treatment of raw material powder of a natural scaly graphite, a pyrolytic graphite, a kish graphite, etc., with a strong oxidizing agent. Examples of the strong oxidizing agent include an inorganic acid such as concentrated sulfuric acid, nitric acid, and selenic acid, concentrated nitric acid, perchloric acid, perchlorate, permanganate, dichromate, and hydrogen peroxide. The thermally expandable graphite is a crystalline compound that maintains the layer structure of carbon as it is.

The thermally expandable graphite may be subjected to neutralization. In other words, the thermally expandable graphite obtained by the treatment with a strong oxidizing agent as described above may be further subjected to neutralization with ammonia, a lower aliphatic amine, an alkaline metal compound, an alkaline earth metal compound, etc.

The content of the thermally expandable graphite in the fire resistant material of the present invention is preferably 20 to 500 parts by mass, more preferably 50 to 300 parts by mass, still more preferably 100 to 250 parts by mass, and furthermore preferably 110 to 200 parts by mass, relative to 100 parts by mass of a matrix resin. With a content of the thermally expandable graphite equal to or more than the lower limits, the expansion pressure of the thermally expandable fire resistant material is easily increased. With a content of the thermally expandable graphite equal to or less than the upper limits, the shape retention, processability, etc., are improved.

The thermally expandable graphite of the present invention has an average aspect ratio of preferably 15 or more, more preferably 20 or more, and usually 1000 or less. With an average aspect ratio of the thermally expandable graphite equal to or more than the lower limit, the expansion pressure of the fire resistant material is easily enhanced.

The aspect ratio of the thermally expandable graphite is obtained as follows. The maximum size (major axis) and the minimum size (minor axis) of 10 or more pieces (for example, 50 pieces) of thermally expandable graphite are measured, and the average of the ratios (maximum size/minimum size) is defined as the aspect ratio.

The average particle size of thermally expandable graphite is preferably 50 to 500 µm, more preferably 100 to 400 µm, from the viewpoint of obtaining a desired expansion pressure. Incidentally, the average particle size of thermally expandable graphite is obtained from the average of the maximum sizes of 10 or more pieces (for example, 50 pieces) of thermally expandable graphite.

The minimum size and the maximum size of thermally expandable graphite described above may be measured, for example, by using a field emission-type scanning electron microscope (FE-SEM).

(Matrix Resin)

The fire resistant material of the present invention contains at least one matrix resin selected from the group consisting of a thermoplastic resin and a rubber.

(Thermoplastic Resin)

Preferred examples of the thermoplastic resin contained in the fire resistant material of the present invention include a polyolefin based resin, a polyvinyl chloride based resin, and a fluorine based resin, though not particularly limited.

Examples of the polyolefin based resin include a polypropylene resin, a polyethylene resin, an ethylene-vinyl acetate copolymer, and an ethylene-acrylic acid ester copolymer. Since these polyolefin based resins are non-chlorine based resin, the environmental load is small and handling is easy. Among these polyolefin resins, an ethylene-vinyl acetate copolymer is preferred from the viewpoint of enhancing the expansion pressure of the fire resistant material.

Examples of the polyvinyl chloride based resin include a polyvinyl chloride resin (PVC) and a chlorinated polyvinyl chloride (CPVC).

Examples of the fluorine based resin include polytetrafluoroethylene, a tetrafluoroethylene-hexafluoropropylene copolymer resin, polychlorotrifluoroethylene, polyvinylidene fluoride, and polyvinyl fluoride.

(Rubber)

Examples of the rubber include natural rubber, isoprene rubber, butyl rubber, butadiene rubber (BR), 1,2-polybutadine rubber, styrene-butadiene rubber (SBR), chloroprene rubber, nitrile rubber (NBR), ethylene-propylene rubber, ethylene-propylene-diene rubber (EPDM), chlorosulfonated polyethylene, acrylic rubber, epichlorohydrin rubber, multi-vulcanized rubber, non-vulcanized rubber, silicone rubber, fluorine rubber, and urethane rubber. Among them, chloroprene rubber is preferred from the viewpoints of improving the fire resistance and enhancing the expansion pressure of the fire resistant material.

It is preferable that the thermoplastic resin of the present invention be an ethylene-vinyl acetate copolymer or a polyvinyl chloride based resin among those described above, from the viewpoint of enhancing the expansion pressure of the fire resistant material. Further, it is preferable that the rubber of the present invention include a chloroprene rubber from the viewpoint of enhancing the expansion pressure of the fire resistant material.

It is preferable that the fire resistant material of the present invention have a composition adjusted depending on the types of the thermoplastic resin and the rubber, from the viewpoint of enhancing the expansion pressure.

<Thermoplastic Resin: Ethylene-Vinyl Acetate Copolymer>

It is preferable that an ethylene-vinyl acetate copolymer be used as the thermoplastic resin contained in a fire resistant material, being a non-chlorine based resin which hardly generates dioxin or the like, kneadable with an expandable graphite or the like at relatively low temperature without containing a plasticizer.

A fire resistant material containing an ethylene-vinyl acetate copolymer as the thermoplastic resin and a thermally expandable graphite tends to have enhanced expansion pressure, so that the fire resistance can be improved. In particular, use of an ethylene-vinyl acetate copolymer having a specific structure described below effectively improves the expansion pressure, so that excellent fire resistance can be exhibited.

It is preferable that the ethylene-vinyl acetate copolymer contain an ethylene-vinyl acetate copolymer component having a melt flow rate (MFR) at 190° C. of 8.0 g/10 min or less (hereinafter, also referred to as low-MFR component), from the viewpoints of enhancing the expansion pressure of the fire resistant material and improving formability. The melt flow rate (MFR) at 190° C. of the low-MFR component is more preferably 6.0 g/10 min or less, still more preferably 1.0 g/10 min or less. The melt flow rate (MFR) at 190° C. of the low-MFR component is preferably 0.05 g/10 min or more, more preferably 0.1 g/10 min or more, and still more preferably 0.3 g/10 min or more, from the viewpoint of formability of the fire resistant material.

A fire resistant material containing both of the low-MFR component and a crosslinking agent described below enables the expansion pressure to be further enhanced.

The ethylene-vinyl acetate copolymer may contain an ethylene-vinyl acetate copolymer component having a melt flow rate (MFR) at 190° C. of more than 8.0 g/10 min (high MFR component), within a range not impairing the effect of the present invention. From the viewpoint of enhancing the expansion pressure of the fire resistant material, the content of the low-MFR component based on the total amount of the ethylene-vinyl acetate copolymer is preferably 50 mass % or more, more preferably 70 mass % or more, still more preferably 90 mass % or more, and furthermore preferably 100 mass %.

Incidentally, the melt flow rate of the ethylene-vinyl acetate copolymer at 190° C. is a measurement value under a load of 2.16 kg, measured in accordance with JIS K7210: 1999.

It is also preferable that in the case of using an ethylene-vinyl acetate copolymer, the copolymer contains an ethylene-vinyl acetate copolymer component having a vinyl acetate content of 20 mass % or more (hereinafter, also referred to as high-Vac component), from the viewpoint of enhancing the expansion pressure of the fire resistant material. The vinyl acetate content of the high-Vac component is more preferably 25 mass % or more, still more preferably 30 mass % or more. The vinyl acetate content of the high-Vac component is preferably 50 mass % or less, more preferably 45 mass % or less.

A fire resistant material containing both of the high-Vac component and a crosslinking agent described below enables the expansion pressure to be further enhanced.

The ethylene-vinyl acetate copolymer may contain an ethylene-vinyl acetate copolymer component having a vinyl acetate content of less than 25 mass % (low-Vac component), within a range not impairing the effect of the present invention. From the viewpoint of enhancing the expansion pressure of the fire resistant material, the content of the high-Vac component based on the total amount of the ethylene-vinyl acetate copolymer is preferably 50 mass % or more, more preferably 70 mass % or more, still more preferably 90 mass % or more, and furthermore preferably 100 mass %.

Incidentally, the MFR and the vinyl acetate content are separate parameters that represent the structure of an ethylene-vinyl acetate copolymer, so that there exists a component corresponding to both of the low-MFR component and the high-Vac component (a low-MFR and high-Vac component). In the case where a fire resistant material contains a low-MFR and high-Vac component, the fire resistant material naturally contains both of the low-MFR component and the high-Vac component.

In the case of using an ethylene-vinyl acetate copolymer, it is preferable that an ethylene-vinyl acetate copolymer component having a melt flow rate (MFR) at 190° C. of 8.0 g/10 min or less and a vinyl acetate content of 20 mass % or more (a low-MFR and high-Vac component) be contained, from the viewpoint of further enhancing the expansion pressure of the fire resistant material. The preferred MFR and the vinyl acetate content of the low-MFR and high-Vac component are as described in explanation of the low-MFR component and high-Vac component.

A fire resistant material containing both of the low-MFR and high-Vac component and a crosslinking agent described below enables to effectively enhance the expansion pressure.

The content of the low-MFR and high-Vac component based on the total amount of the ethylene-vinyl acetate copolymer is preferably 50 mass % or more, more preferably 70 mass % or more, still more preferably 90 mass % or more, and furthermore preferably 100 mass %.

In the case of using an ethylene-vinyl acetate copolymer as the thermoplastic resin, the thermally expandable graphite content relative to 100 parts by mass of the thermoplastic resin is preferably 20 to 500 parts by mass, more preferably 50 to 300 parts by mass, and still more preferably 80 to 150 parts by mass. With a thermally expandable graphite content equal to or more than the lower limits, the expansion pressure of the thermally expandable fire resistant material is easily enhanced. With a thermally expandable graphite content equal to or less than the upper limits, the shape retention, processability, etc., are improved.

(Crosslinking Agent)

The fire resistant material of the present invention may contain a crosslinking agent. In particular, in the case of using an ethylene-vinyl acetate copolymer as the thermoplastic resin, use of a crosslinking agent in combination enhances the expansion pressure, so that the fire resistance can be improved. In the case where a fire resistant material contains a crosslinking agent, it is presumed that crosslinking of the ethylene-vinyl acetate copolymer proceeds by heat in case of fire to increase viscosity, resulting in enhanced expansion pressure.

In the case of using an ethylene-vinyl acetate copolymer in combination with a crosslinking agent, a known ethylene-vinyl acetate copolymer may be used without particular limitation. In other words, in the case of using a crosslinking agent, the MFR of the ethylene-vinyl acetate copolymer and the vinyl acetate content are not particularly limited. However, from the viewpoint of further enhancing the expansion pressure of the fire resistant material, even in the case of using a crosslinking agent in combination, the ethylene-vinyl acetate copolymer contains preferably at least any one of a low-MFR component and a high-Vac component, more preferably a low-MFR and high-Vac component.

A known crosslinking agent may be used without limitation, and examples thereof include an organic peroxide and an azo compound.

Examples of the organic peroxide include 2,5-dimethylhexane, 2,5-dihydroperoxide, 2,5-dimethyl-2,5-di(t-butylperoxy)hexane, 3-di-t-butylperoxide, t-dicumylperoxide, 2,5-dimethyl-2,5-di(t-butylperoxy)hexyne, dicumylperoxide, α,α'-bis(t-butylperoxy isopropyl)benzene, n-butyl-4,4-bis(t-butylperoxy)butane, 2,2-bis(t-butylperoxy)butane, 1,1-bis(t-butylperoxy)cyclohexane, 1,1-bis(t-butylperoxy)3,3,5-trimethylcyclohexane, t-butylperoxy benzoate; benzoyl peroxide; and t-butylperoxy-2-ethylhexyl carbonate.

Examples of the azo compound include azobisisobutyronitrile and azobis(2,4-dimethylvaleronitrile).

Among the crosslinking agents described above, one that hardly causes a crosslinking reaction at the kneading temperature of the respective components (for example, 70° C. to 150° C.) during production of a fire resistant material, and easily causes a crosslinking reaction of the ethylene-vinyl acetate copolymer by heat in case of fire, is preferred. From such a viewpoint, as the crosslinking agent, dicumylperoxide, 2,5-dimethyl-2,5-di(t-butylperoxy)hexane, t-butylperoxy-2-ethylhexyl monocarbonate, etc. are preferred.

In the case where a fire resistant material contains a crosslinking agent, the crosslinking agent content relative to 100 parts by mass of a thermoplastic resin is preferably 0.1 to 10 parts by mass, more preferably 0.5 to 7 parts by mass, and still more preferably 1 to 5 parts by mass.

<Thermoplastic Resin: Polyvinyl Chloride Based Resin>

It is preferable that a polyvinyl chloride based resin be used as the thermoplastic resin contained in a fire resistant material from the viewpoint of lowering the ratio of carbon contained in the fire resistant material so as to enhance the fire resistance.

Although the polyvinyl chloride based resin may be a polyvinyl chloride resin (PVC) or a chlorinated polyvinyl chloride resin (CPVC), use of a polyvinyl chloride resin is preferred.

The polyvinyl chloride resin may be a vinyl chloride homopolymer, or a vinyl chloride based copolymer. The vinyl chloride based copolymer is a copolymer of vinyl chloride and a monomer having an unsaturated bond copolymerizable with vinyl chloride, containing 50 mass % or more of a structural unit derived from vinyl chloride.

Examples of the monomer having an unsaturated bond copolymerizable with vinyl chloride include a vinyl ester such as vinyl acetate and vinyl propionate, acrylic acid, methacrylic acid, an acrylic acid ester such as methyl acrylate and ethyl acrylate, a methacrylic acid ester such as methyl methacrylate and ethyl methacrylate, an olefin such as ethylene and propylene, acrylonitrile, an aromatic vinyl such as styrene, and vinylidene chloride.

The polyvinyl chloride based resin may be a chlorinated polyvinyl chloride resin. The chlorinated polyvinyl chloride resin is a chlorinated polyvinyl chloride resin obtained by chlorination of a vinyl chloride homopolymer, a vinyl chloride based copolymer, etc.

One of the polyvinyl chloride based resins described above may be used alone, or two or more thereof may be used in combination.

The average polymerization degree of the polyvinyl chloride based resin is not particularly limited, and is preferably 400 or more, more preferably 700 or more, still more preferably 1000 or more, and preferably 3000 or less, more preferably 2000 or less. With an average polymerization degree of the polyvinyl chloride based resin equal to or more than the lower limits, the expansion pressure of the fire resistant material is easily enhanced, so that the fire resistance is improved. With an average polymerization degree of the polyvinyl chloride based resin equal to or less than the upper limits, the good processability tends to be obtained. Incidentally, the average polymerization degree is measured in accordance with JIS K6720-2.

In the case of using a polyvinyl chloride based resin as the thermoplastic resin, the thermally expandable graphite content relative to 100 parts by mass of the thermoplastic resin is preferably 20 to 500 parts by mass, more preferably 50 to 400 parts by mass, still more preferably 100 to 350 parts by mass, and furthermore preferably 150 to 300 parts by mass. With a thermally expandable graphite content equal to or more than the lower limits, the expansion pressure of the thermally expandable fire resistant material is easily enhanced. With a thermally expandable graphite content equal to or less than the upper limits, the shape retention, the processability, etc., are improved.

<Plasticizer>

The fire resistant material of the present invention may contain a plasticizer. In particular, in the case of using a polyvinyl chloride based resin, use of a plasticizer tends to improve the formability. The plasticizer content relative to 100 parts by mass of the thermoplastic resin is preferably 20 to 300 parts by mass, more preferably 50 to 200 parts by mass.

In the case of using a polyvinyl chloride based resin, it is preferable that the plasticizer contain a solid plasticizer. By containing a solid plasticizer, the expansion pressure of the fire resistant material is easily enhanced to improve the fire resistance. The solid plasticizer refers to a plasticizer in a solid state at 23° C.

Examples of the solid plasticizer include an ethylene-vinyl acetate-carbon monoxide copolymer, a benzoic acid ester, and a paraffin wax, and, in particular, an ethylene-vinyl acetate-carbon monoxide copolymer is preferred from the viewpoint of easily enhancing the expansion pressure of the fire resistant material.

The ethylene-vinyl acetate-carbon monoxide copolymer is a copolymer containing an ethylene component, a vinyl acetate component, and a carbon monoxide component. The ethylene-vinyl acetate-carbon monoxide copolymer may be produced, for example, by copolymerizing ethylene, vinyl acetate and carbon monoxide in the presence of a catalyst through high speed stirring at high temperature (for example, 160 to 230° C.) under high pressure (for example, 24,000 to 27,000 psi). Examples of the catalyst include t-butylperoxy isobutylate, and azo isobutyronitrile.

Examples of the ethylene-vinyl acetate-carbon monoxide copolymer that is commercially available include "Elvaloy 741" and "Elvaloy 742" manufactured by Du Pont.

In the ethylene-vinyl acetate-carbon monoxide copolymer, the ethylene component content is preferably 40 to 80 mass %, more preferably 50 to 70 mass %. The vinyl acetate component content is preferably 10 to 50 mass %, more preferably 10 to 40 mass %. Further, the carbon monoxide content is preferably 5 to 30 mass %, more preferably 5 to 20 mass %. Incidentally, the ethylene-vinyl acetate-carbon monoxide copolymer may be copolymerized with another monomer such as (meth)acrylic acid ester, on an as needed basis.

The solid plasticizer content relative to 100 parts by mass of the thermoplastic resin is preferably 20 to 300 parts by mass, more preferably 50 to 200 parts by mass, and still more preferably 60 to 140 parts by mass, from the viewpoints of enhancing the expansion pressure and prolonging the fire resistive period.

The plasticizer may include a solid plasticizer alone, or may include a liquid plasticizer together with a solid plasticizer. Use of a solid plasticizer in combination with a liquid plasticizer improves the formability while maintaining the expansion pressure of the fire resistant material at a high level. Incidentally, the liquid plasticizer refers to a plasticizer in a liquid state at 23° C.

Specific examples of the liquid plasticizer include a phthalic acid ester based plasticizer such as di-2-ethylhexyl phthalate (DOP), di-n-octyl phthalate, diisononyl phthalate (DINP), diisodecyl phthalate (DIDP), diundecyl phthalate (DUP), and a phthalic acid ester of a higher alcohol or mixed alcohol having about 10 to 13 carbon atoms, an aliphatic ester based plasticizer such as di-2-ethylhexyl adipate (DOA), diisobutyl adipate (DIBA), dibutyl adipate (DBA), di-n-octyl adipate, di-n-decyl adipate, diisodecyl adipate, di-2-ethylhexyl azelate, dibutyl sebacate, di-2-ethylhexyl sebacate, and dibutoxyethoxyethyl adipate, a trimellitic acid ester based plasticizer such as tri-2-ethylhexyl trimellitate (TOTM), tri-n-octyl trimellitate, tridecyl trimellitate, triisodecyl trimellitate, and di-n-octyl-n-decyl trimellitate, and a process oil such as mineral oil.

In the case where a plasticizer contains the solid plasticizer and the liquid plasticizer, the mass ratio of the liquid plasticizer to the solid plasticizer (liquid plasticizer/solid plasticizer) is preferably 5/95 to 60/40, more preferably 5/95 to 40/60, and still more preferably 20/80 to 40/60. Within such a range, it is easy to improve formability of the fire resistant material while enhancing the expansion pressure.

In the case of using a polyvinyl chloride based resin as the thermoplastic resin, the viscosity of the mixture of the polyvinyl chloride based resin and the plasticizer that constitutes the fire resistant material at 300° C. is preferably 500 Pa-s or more, more preferably 800 Pa-s or more, still more preferably 1000 Pa-s or more, and usually 50000 Pa-s or less. With a viscosity of the mixture of the polyvinyl chloride based resin and the plasticizer that constitutes the fire resistant material at 300° C. equal to or less than the lower limit, the expansion pressure of the fire resistant material is easily enhanced to improve the fire resistance.

Incidentally, the viscosity is measured by using a rheometer, and the details of the measurement are according to the method described in Examples.

<Chloroprene Rubber>

It is preferable that a chloroprene rubber be used as rubber contained in a fire resistant material, from the viewpoint of reducing the ratio of the carbon contained in the fire resistant material to enhance the fire resistance.

As the chloroprene rubber, a sulfur modified type (G-type), a non-sulfur modified type (W-type), etc., may be also used.

The Mooney viscosity ML (14) of a chloroprene rubber at 100° C. is preferably 60 to 120, more preferably 70 to 90, and still more preferably 80 to 100. A chloroprene rubber having a Mooney viscosity ML (1+4) in the range at 100° C. allows the expansion pressure of a fire resistant material to be easily enhanced.

Incidentally, the Mooney viscosity is measured in accordance with JIS K6300.

In the case of using a chloroprene rubber, the chloroprene rubber alone may be used as rubber, or as described below, the chloroprene rubber may be used in combination with another rubber other than chloroprene rubber. In the case of using a chloroprene rubber, the chloroprene rubber content based on the total amount of rubber is, for example, 10 mass % or more, more preferably 20 mass % or more.

In the case of using a chloroprene rubber, the thermally expandable graphite content relative to 100 parts by mass of rubber is preferably 20 to 500 parts by mass, more preferably 50 to 300 parts by mass, and still more preferably 80 to 150 parts by mass. With a thermally expandable graphite content equal to or more than the lower limits, the expansion pressure of the thermally expandable fire resistant material is easily enhanced. With a thermally expandable graphite content equal to or less than the upper limits, the shape retention, processability, etc., are easily improved.

In the case of using a chloroprene rubber, it is preferable that the fire resistant material contain a plasticizer. As the plasticizer, the liquid plasticizer described above may be used without any particular limitation, and from the viewpoint of improving the formability of the fire resistant material, an aliphatic ester based plasticizer is preferred. In particular, an aliphatic ester based plasticizer having an ether bond is more preferred, and dibutoxyethoxyethyl adipate is still more preferred. For example, Adekacizer RS-107 manufactured by Adeka Corporation and the like correspond to a commercial product of dibutoxyethoxyethyl adipate, referred to as adipic acid ether ester based product.

The plasticizer content relative to 100 parts by mass of a chloroprene rubber is preferably 10 to 80 parts by mass, more preferably 20 to 50 parts by mass. With a plasticizer content equal to or more than the lower limits, the formability of the fire resistant material is improved, and with a plasticizer content equal to or less than the upper limits, the expansion pressure can be enhanced.

In the case of using a chloroprene rubber, a liquid rubber may be used in combination with the plasticizer described above or instead of the plasticizer. The liquid rubber is not particularly limited as long as it is in a liquid state at normal temperature (25° C.), and examples thereof include a liquid isoprene rubber, a liquid butadiene rubber, and a liquid styrene butadiene rubber. From the viewpoint of improving the formability, a liquid styrene butadiene rubber is preferred.

In the case where a chloroprene rubber and a liquid rubber are used in combination, the liquid rubber content relative to 100 parts by mass of the chloroprene rubber is preferably 5 to 500 parts by mass, more preferably 10 to 400 parts by mass, and still more preferably 20 to 300 parts by mass. With a liquid rubber content equal to or more than the lower limits, the formability of a fire resistant material is improved, and with a liquid rubber content equal to or less than the upper limits, the expansion pressure can be enhanced.

(Fire Retardant)

It is preferable that the fire resistant material of the present invention contain a fire retardant. By containing a fire retardant, the fire resistance is improved.

Examples of the fire retardant include various phosphoric acid esters such as red phosphorus, triphenyl phosphate (triphenyl phosphate), tricresyl phosphate, trixylenyl phosphate, cresyldiphenyl phosphate and xylenyldiphenyl phosphate, a metal phosphate such as sodium phosphate, potassium phosphate, and magnesium phosphate, a metal phosphite such as sodium phosphite, potassium phosphite, magnesium phosphite and aluminum phosphite, ammonium polyphosphate, and ethylenediamine phosphate. Further, examples of the fire retardant include a compound represented by the following general formula (1):

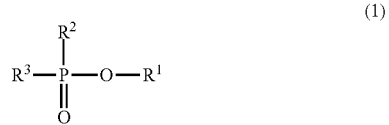

(1)

In the general formula (1), $R^1$ and $R^3$ are the same or different, and represent hydrogen, a linear or branched alkyl group having 1 to 16 carbon atoms, or an aryl group having 6 to 16 carbon atoms. $R^2$ represents a hydroxy group, a linear or branched alkyl group having 1 to 16 carbon atoms, a linear or branched alkoxyl group having 1 to 16 carbon atoms, an aryl group having 6 to 16 carbon atoms, or an aryloxy group having 6 to 16 carbon atoms.

Specific examples of the compound represented by the general formula (1) include methylphosphonic acid, dimethyl methylphosphonate, diethyl methylphosphonate, ethylphosphonic acid, n-propylphosphonic acid, n-butylphosphonic acid, 2-methylpropylphosphonic acid, t-butylphosphonic acid, 2,3-dimethyl-butylphosphonic acid, octylphosphonic acid, phenylphosphonic acid, dioctyl phenylphosphonate, dimethylphosphinic acid, methylethylphosphinic acid, methylpropylphosphinic acid, diethylphosphinic acid, dioctylphosphinic acid, phenylphosphinic acid, diethylphenylphosphinic acid, diphenylphosphinic acid, and bis(4-methoxyphenyl) phosphinic acid. One of the fire retardant may be used alone, or two or more thereof may be used in combination.

As the fire retardant of the present invention, a boron based compound and a metal hydroxide may be also used.

Examples of the boron based compound include zinc borate.

Examples of the metal hydroxide include aluminum hydroxide, magnesium hydroxide, calcium hydroxide, and hydrotalcite. In the case of using a metal hydroxide, water is produced by heat caused by firing, so that fire can be rapidly extinguished.

Among the fire retardants described above, from the viewpoints of safety, cost, etc., red phosphorus, a phosphoric acid ester such as triphenyl phosphate, aluminum phosphite, ammonium polyphosphate, ethylenediamine phosphate, and zinc borate are preferred. In particular, aluminum phosphite, ethylenediamine phosphate, and ammonium polyphosphate are more preferred, and aluminum phosphite is still more preferred. Aluminum phosphite has expansibility, so that a fire resistant material containing it allows the expansion pressure to be easily enhanced, resulting in more effective improvement in fire resistance.

The average particle size of the fire retardant is preferably 1 to 200 μm, more preferably 1 to 60 μm, still more preferably 3 to 40 μm, and furthermore preferably 5 to 20 μm. With an average particle size of the fire retardant within the range, the dispersing ability of the fire retardant in the fire resistant material is improved, so that the fire retardant can be uniformly dispersed in a matrix resin, or the amount of the fire retardant added to a matrix resin can be increased. With an average particle size out of the range, the fire retardant is hardly dispersed in a matrix resin, so that the fire retardant is difficult to be uniformly dispersed in a matrix resin or difficult to be added in a large amount.

Incidentally, the average particle diameter of the fire retardant is a median diameter (D50) value measured by a laser diffraction/scattering particle size distribution analyzer.

The fire retardant content in the fire resistant material of the present invention relative to 100 parts by mass of a matrix resin is preferably 15 to 1000 parts by mass, more preferably 20 to 300 parts by mass, and still more preferably 30 to 100 parts by mass. With a fire retardant content equal to or more than the lower limits, the fire resistance of the fire resistant material is improved. With a fire retardant content equal to or less than the upper limits, uniform dispersion in a matrix resin is easily achieved, so that the excellent formability, etc. can be obtained.

(Inorganic Filler)

The fire resistant material of the present invention may further contain an inorganic filler other than the fire retardant and the thermally expandable graphite.

The inorganic filler other than the fire retardant and the thermally expandable graphite is not particularly limited, and examples thereof include a metal oxide such as alumina, zinc oxide, titanium oxide, calcium oxide, magnesium oxide, iron oxide, tin oxide, antimony oxide and ferrite, a metal carbonate such as basic magnesium carbonate, calcium carbonate, magnesium carbonate, zinc carbonate, strontium carbonate and barium carbonate, silica, diatomaceous earth, dawsonite, barium sulfate, talc, clay, mica, montmorillonite, bentonite, activated clay, sepiolite, imogolite, sericite, glass fiber, glass beads, silica based balloon, aluminum nitride, boron nitride, silicon nitride, carbon black, graphite, carbon fiber, carbon balloon, charcoal powder, various metal powder, potassium titanate, magnesium sulfate, lead zirconate titanate, zinc stearate, calcium stearate, aluminum borate, molybdenum sulfide, silicon carbide, stainless steel fiber, various magnetic powder, slag fiber, flay ash and dewatered sludge. One of these inorganic fillers may be used alone, or two or more thereof may be used in combination.

From the viewpoints of enhancing the expansion pressure and improving the formability, use of at least one selected from the group consisting of iron oxide, calcium carbonate, magnesium oxide and zinc oxide as the inorganic filler is preferred, and, in particular, use in combination of iron oxide and calcium carbonate is more preferred. In particular, in the case of using chloroprene rubber as rubber, addition of the inorganic filler described above allows these effects to be more significantly exhibited.

The average particle size of the inorganic filler is preferably 0.5 to 100 μm, more preferably 1 to 50 μm. With a low content of inorganic filler, filler having a small particle size is preferred from the viewpoint of improving the dispersing ability, and with a high content, filler having a large particle size is preferred because the viscosity of a fire resistant material increases with increase in filling, resulting in reduction in formability.

In the case where the fire resistant material of the present invention contains an inorganic filler other than a fire retardant and a thermally expandable graphite, the content thereof relative to 100 parts by mass of a matrix resin is preferably 10 to 300 parts by mass, more preferably 10 to 200 parts by mass. With an inorganic filler content in the range, the mechanical properties of the fire resistant material can be improved.

The fire resistant material of the present invention may contain various types of additive components within a range not impairing the object of the present invention on an as needed basis.

The type of the additive component is not particularly limited, and various types of additives may be used. Examples of such an additive include a lubricant, a shrinkage reducing agent, a crystal nucleating agent, a colorant (pigment, dye, etc.), a UV absorber, an antioxidant, an anti-aging agent, a dispersant, a gelling accelerator, a filler, a reinforcing agent, a flame retardant promoter, an antistatic agent, a surfactant, a vulcanizing agent, and a surface treatment agent. The amount of an additive added may be appropriately selected within a range not impairing the formability, etc. The additive may be used alone or in combination of two or more.

It is preferable that the fire resistant material be in a sheet shape, and from the viewpoint of fire resistance and handling properties, the thickness of the sheet is preferably 0.2 to 10 mm, more preferably 0.5 to 3.0 mm, though not particularly limited.

As described above, according to the thermally expandable fire resistant material of the present invention having an expansion pressure of 3.0 N/cm² or more, a thermally expandable fire resistant material having excellent fire resistance can be provided. Further, according to the invention described in the following items [13] to [15], a thermally expandable fire resistant material having a high expansion ratio and excellent fire resistance can be also obtained.

[13] A fire resistant material containing an ethylene-vinyl acetate copolymer and a thermally expandable graphite, the ethylene-vinyl acetate copolymer containing a low-MFR component having a melt flow rate (MFR) at 190° C. of 8.0 g/10 min or less.

[14] A fire resistant material containing an ethylene-vinyl acetate copolymer and a thermally expandable graphite, the ethylene-vinyl acetate copolymer containing a high Vac-EVA component with a vinyl acetate content of 20 mass % or more.

[15] A fire resistant material containing an ethylene-vinyl acetate copolymer and a thermally expandable graphite, further containing a crosslinking agent.

Incidentally, the details of each component specified in the items [13] to [15] are as described above, and regarding optional components not specified in [13] to [15], ones described above may be used without particular limitation.

(Production Method of Fire Resistant Material)

The fire resistant material of the present invention may be produced, for example, by the following method.

First, a thermally expandable graphite, a matrix resin, a plasticizer to be added on an as needed basis, a fire retardant, a crosslinking agent, an inorganic feeler, and other components in specified amounts are kneaded by a kneader such as a kneading roll to produce a fire resistant resin composition.

Subsequently, the resulting fire resistant resin composition is formed into a sheet shape, for example, by a known forming method such as pressing, calendering, and extruding, so that a fire resistant material can be obtained.

The temperature for kneading and the temperature for forming into a sheet shape are preferably less than the initiation temperature of expansion of the thermally expandable graphite. In the case where a crosslinking agent is added, it is preferable that crosslinking hardly occur by the crosslinking agent at the temperatures. Accordingly, the temperature for kneading is preferably 70 to 150° C., more preferably 90 to 140° C. The temperature for forming into a sheet shape is preferably 80 to 130° C., more preferably 90 to 120° C.

(Fire Resistant Multilayer Sheet)

The fire resistant material of the present invention may be made of a fire resistant multilayer sheet including another sheet component and/or an adhesive layer laminated thereto. The fire resistant multilayer sheet includes, for example, a base material and a fire resistant material laminated to one or both sides of the base material.

The fire resistant multilayer sheet may be obtained, for example, by forming a fire resistant resin composition into a sheet shape on the base material.

Also, the fire resistant multilayer sheet may include a fire resistant material and an adhesive layer. The adhesive layer may be laminated to one or both sides of the fire resistant material.

Further, the fire resistant multilayer sheet may include a fire resistant material, a base material and an adhesive layer. In such a fire resistant multilayer sheet, the fire resistant material may be disposed on one side of the base material and the adhesive layer may be disposed on the other side. Alternatively, the fire resistant material and the adhesive layer may be disposed on one side of the base material in this order. The adhesive layer may be formed, for example, by transferring an adhesive agent coated on a release paper to a fire resistant multilayer sheet.

In the following, the fire resistant multilayer sheet is described in detail with reference to a preferred embodiment.

The fire resistant multilayer sheet of the present invention includes a base material, a fire resistant material disposed on one side of the base material, an adhesive layer disposed on the opposite side of the fire resistant material on which the base material is disposed, and a separator in this order.

FIG. 1 is a view showing the fire resistant multilayer sheet in an embodiment of the present invention. A fire resistant material 2 is disposed on one side of a base material 1. An adhesive layer 3 is disposed on the opposite side of the side of the fire resistant material 2 on which the base material 1 is disposed, and a separator 4 is further disposed on the opposite side of the side of the adhesive layer 3 on which the fire resistant material 2 is disposed.

[Base Material]

The base material of the present invention is, for example, in a form of woven fabric, nonwoven fabric, film, or the like, which may be formed of a thermoplastic resin, a thermosetting resin, an elastomer resin, or the like. It is preferable that the base material be formed of a thermoplastic resin, in particular. Alternatively, the base material may be formed of glass fiber, ceramic fiber, cellulose fiber, polyester fiber, carbon fiber, graphite fiber, thermosetting resin fiber, or the like.

A film form of the base material is preferred. Also, a film having internal cavities may be favorably used.

Specific examples of the thermoplastic resin include a polyvinyl chloride, a polyester such as polyethylene terephthalate and polybutylene terephthalate, a polyolefin such as polyethylene, polypropylene, poly(1-butene) and polypentene, polyvinyl acetate, polystyrene, an acrylic resin, an acrylonitrile-butadiene-styrene (ABS) resin, polycarbonate, polyamide, polyphenylene ether, and polyether sulfone.

Among the thermoplastic resins described above, polyvinyl chloride, polyethylene terephthalate, polyolefin and polyvinyl acetate are preferred from the viewpoint of adhesion to the fire resistant material. Further, from the viewpoint of flame retardancy, polyvinyl chloride is more preferred. Also, a polyethylene terephthalate film having internal cavities is also preferred.

Specific examples of the thermosetting resin include an epoxy resin, a urethane resin, a phenol resin, an unsaturated polyester, an alkyd resin, a urea resin, and a polyimide.

Specific examples of the elastomer resin include isoprene rubber, butadiene rubber, 1,2-polybutadiene rubber, styrene-butadiene rubber, chloroprene rubber, nitrile rubber, butyl rubber, ethylene-propylene rubber, chlorosulfonated polyethylene, acrylic rubber, epichlorohydrin rubber, silicone rubber, fluorine rubber, urethane rubber, polyisobutylene rubber, and butylchloride rubber.

One or two or more types of the thermoplastic resin, the thermosetting resin and the elastomer resin are used.

The thickness of the base material is 1 to 20% of the thickness of the fire resistant multilayer sheet. With a thickness of the base material of less than 1% of the thickness of the fire resistant multilayer sheet, the base material may cause breakage due to difficulty in supporting the fire resistant material. With a thickness of the base material of more than 20% of the thickness of the fire resistant multilayer sheet, the appearance of the fire resistant multilayer sheet may be degraded due to peeling between the base material and the fire resistant material and wrinkles on the base material which are caused when the fire resistant multilayer sheet is bent.

The thickness of the base material is, for example, 10 to 600 μm, preferably 20 to 450 μm, more preferably 30 to 400 μm. With an absolute thickness of the base material set to the lower limit or more, the strength for supporting the fire resistant material can be imparted to the base material. With a thickness set to the upper limit or less, the base material is prevented from being thickened beyond necessity, so that the fire resistant multilayer sheet is more easily used for building material such as a door.

The tensile elongation of the base material is, for example, 5% or more, preferably 15% or more, more preferably 30% or more. With a tensile elongation of the base material set to the lower limit or more, the stress generated in the fire resistant multilayer sheet decreases when the fire resistant multilayer sheet is bent, so that peeling between the base material and the fire resistant material and occurrence of wrinkles on the base material can be prevented. The tensile elongation of the base material is, for example, 100% or less, preferably 50% or less, from the viewpoint of the strength required for supporting the fire resistant material.

The adhesive strength between the base material and the fire resistant material is, for example, 5 N/10 mm or more, preferably 25 N/10 mm or more, and more preferably 50 N/10 mm or more. With an adhesive strength between the base material and the fire resistant material set to the lower limit or more, peeling between the base material and the fire resistant material and occurrence of wrinkles on the base material are prevented when the fire resistant multilayer sheet is bent. In order to set the adhesive strength between the base material and the fire resistant material to the lower limit or more, for example, raising adhesion processing temperature, increasing in pressing pressure, etc. are conceivable. The upper limit of the adhesive strength between the base material and the fire resistant material is, for example, 200 N/10 mm, preferably 100 N/10 mm.

[Fire Resistant Material]

The thickness of the fire resistant material is, for example, 1000 to 3000 μm, preferably 1200 to 3000 μm, more preferably 1400 to 2700 μm, and still more preferably 1500 to 2500 μm. With a thickness of the fire resistant material set to the lower limit or more, an appropriate fire resistance is easily imparted to the fire resistant multilayer sheet. With a thickness set to the upper limit or less, the fire resistant material is prevented from being thickened beyond necessity so as to be more easily used for building material such as a door component.

[Adhesive Layer]

The fire resistant multilayer sheet of the present invention includes an adhesive layer and a separator in sequence on the opposite side of the side of the fire resistant material on which the base material is disposed.

The adhesive layer may be a single layer formed of an adhesive agent alone (hereinafter, also referred to as adhesive agent layer), or may be a pressure-sensitive adhesive double coated tape having an adhesive agent layer on both of the surfaces of a base material for the pressure-sensitive adhesive double coated tape, though the layer formed of an adhesive agent layer is preferred. Incidentally, in the pressure-sensitive adhesive double coated tape, one of the adhesive agent layers is laminated to a fire resistant material or a separator to form the adhesive layer.

The adhesive agent to constitute the adhesive agent layer is not particularly limited, and examples thereof include an acrylic based adhesive agent, a urethan based adhesive agent, and a rubber based adhesive agent. The thickness of the adhesive layer is not particularly limited, for example, being 10 to 500 μm, preferably 50 to 200 μm.

The base material for the pressure-sensitive adhesive double coated tape is not particularly limited as long as it is a base material for use in a general pressure-sensitive adhesive double coated tape, and examples thereof include a nonwoven fabric, paper such as Japanese paper, a woven fabric made of natural fiber or synthetic fiber, a resin film made of polyester, polyolefin, soft polyvinyl chloride, hard polyvinyl chloride or acetate, and a flat yarn cloth.

[Separator]

As the separator, one having a base material for the separator and a release layer disposed on at least one side of the base material for the separator is used. The release layer may be formed through a release treatment of the base material for the separator. The separator is preferably disposed such that the side on which the release layer is provided comes into contact with the adhesive layer. Alternatively, both sides of the separator preferably have a release layer through release treatment of both sides of the base material for the separator.

The release layer is formed of, for example, an organic resin, though not particularly limited. It is preferable that the organic resin be not a silicone resin and have no siloxane bond. As the organic resin, a known releasing agent such as a fluorine based resin, a long-chain alkyl-containing resin, an alkyd based resin, a polyolefin based resin, and a rubber based elastomer may be used.

As the base material for the separator, a resin film, paper, etc. may be used. The resin film may be formed of a thermoplastic resin, a thermosetting resin, or an elastomer resin. Specific examples of the thermoplastic resin, the thermosetting resin, or the elastomer resin for use include ones listed in the description of the resin film, and a thermoplastic resin is preferred.

The thickness of the separator is 0.3 to 10% of the thickness of the fire resistant multilayer sheet. With a thickness of the separator of less than 0.3% of the thickness of the fire resistant multilayer sheet, the separator may be damaged. With a thickness of the separator of more than 10% of the thickness of the fire resistant multilayer sheet, the appearance of the fire resistant multilayer sheet, may be degraded due to peeling between the fire resistant material and the separator and occurrence of wrinkles on the separator when the fire resistant multilayer sheet is bent.

The thickness of the separator is, for example, 1 to 200 µm, preferably 2 to 150 µm, and more preferably 5 to 100 µm. With an absolute thickness of the separator set to the lower limit or more, the strength not to be damaged can be imparted to the separator. With an absolute thickness set to the upper limit or less, peeling between the fire resistant material and the separator and occurrence of wrinkles on the separator can be prevented when the fire resistant multilayer sheet is bent.

The tensile elongation of the separator is, for example, 1% or more, preferably 5% or more, more preferably 10% or more, and still more preferably 15% or more. With a tensile elongation of the base material set to the lower limit or more, the stress generated in the fire resistant multilayer sheet decreases when the fire resistant multilayer sheet is bent, so that peeling between the fire resistant material and the separator and occurrence of wrinkles on the separator can be prevented. The tensile elongation of the separator is, for example, 200% or less, preferably 100% or less, from the viewpoint of the strength required for the separator.

Figure 2:
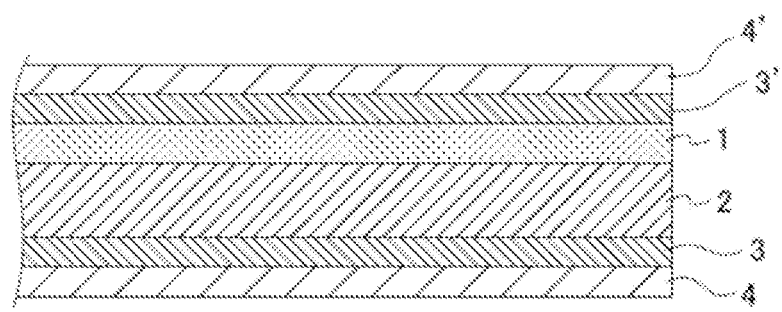
FIG. 2 is a schematic cross-sectional view showing a fire resistant multilayer sheet in another embodiment.

In the present invention, in addition to the adhesive layer and the separator, an adhesive layer and a separator may be further disposed in this order on the opposite side of the side of the base material on which the fire resistant material is disposed. In that case, a fire resistant multilayer sheet in an embodiment is shown in FIG. 2. A fire resistant material 2 is disposed on one side of a base material 1. An adhesive layer 3 is disposed on the opposite side of the side of the fire resistant material 2 on which the base material 1 is disposed, and further, a separator 4 is disposed on the opposite side of the side of the adhesive layer 3 on which the fire resistant material 2 is disposed. An adhesive layer 3 is disposed on the opposite side of the side of the base material 1 on which the fire resistant material 2 is disposed, and further, a separator 4 is disposed on the opposite side of the side of the adhesive layer 3' on which the base material 1 is disposed. The adhesive agent to constitute the adhesive layer 3' and the thickness of the adhesive layer 3' may be the same as or different from those of the adhesive layer 3, preferably being the same. Also, the material to constitute the separator 4' and the thickness of the separator 4' may be the same as or different from those of the separator 4, preferably being the same. Incidentally, the thickness of the separator 4' is 0.3 to 8% of the thickness of the fire resistant multilayer sheet.

[Production Method of Fire Resistant Multilayer Sheet]

The production method of the fire resistant multilayer sheet of the present invention is not limited to a specific production method. The production method of the fire resistant multilayer sheet in an embodiment of the present invention is as follows. A base material, fire resistant material formed of a fire resistant resin composition through extruding, calendering or the like, a pressure-sensitive adhesive double coated tape, and a separator are fed out from rollers respectively so as to be laminated in this order. The laminate is hot pressed and the resulting long fire resistant multilayer sheet is wound around a roller.

The production method of the fire resistant multilayer sheet in another embodiment of the present invention is as follows. A base material, fire resistant material formed of a fire resistant resin composition through extruding, calendering or the like, and a separator are fed out from rollers respectively. On this occasion, the adhesive layer is formed on one side of the fire resistant material or the separator by applying the adhesive agent. These are then laminated in this order, hot pressed, and the resulting long fire resistant multilayer sheet is wound around a roller.

The production method of the fire resistant multilayer sheet in yet another embodiment of the present invention is as follows. A base material, fire resistant material formed of a fire resistant resin composition through extruding, calendering or the like, and a separator having an adhesive layer on one side are fed out from rollers respectively. On this occasion, the adhesive layer disposed on the separator faces the fire resistant material. These are laminated in this order, hot pressed, and the resulting long fire resistant multilayer sheet is wound around a roller.

In each of the embodiments described above, a laminate made of the base material and the fire resistant material obtained by laminating the fire resistant resin composition formed into a film shape through extruding, calendering, or the like on the base material may be used.

Figure 3:
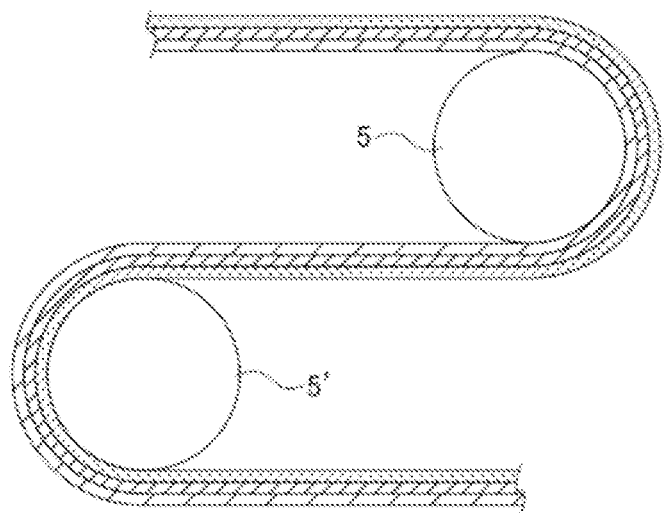
FIG. 3 is a schematic view showing a fire resistant multilayer sheet passing through a path in an embodiment.

The wound fire resistant multilayer sheet may be transferred to another place so as to be subjected to post processing such as flattening of the fire resistant multilayer sheet and making a notch in the longitudinal direction of the fire resistant multilayer sheet in some cases. In such a series of processes, the fire resistant multilayer sheet passes through a path 5, 5' in a pipe shape as shown in FIG. 3. Although a stress is generated on this occasion due to a difference between the inner diameter and the outer diameter in the path, peeling of the base material and the separator each of the fire resistant multilayer sheet of the present invention is prevented, and wrinkles hardly occur on each of the base material and the separator, so that the degradation of appearance of the fire resistant multilayer sheet can be prevented.

The fire resistant multilayer sheet thus structured can prevent peeling of the base material and the separator each and occurrence of wrinkles on the base material and the separator each when the fire resistant multilayer sheet is bent.

The fire resistant material of the present invention and the fire resistant multilayer sheet made of the fire resistant material may be used for various fittings in a detached house, an apartment house, a high-rise housing, a high-rise building, shopping facilities, public facilities, etc., various vehicles such as an automobile and an electric train, a ship, an airplane, etc. Among these, use for fittings is preferred. Specific examples of the fittings to which the fire resistant material is applicable include a wall, a beam, a column, a floor, brick, a roof, a board material, a window, a sliding screen, a gate, a door, a window shutter, a sliding door, a transom, wiring, and piping, though not limited thereto. The fire resistant material of the present invention and the fire resistant multilayer sheet made of the same applied to gaps of fittings such as a window, a gate and a door, in particular, allow the flame to be prevented from entering through the gap.

EXAMPLES

In the following, the present invention is more specifically described with reference to Examples, though the present invention is not limited thereto.

[Evaluation Method]

(I) Expansion Pressure

The expansion pressure was measured by the following procedure.

(1) The fire resistant material in each of Examples and Comparative Examples was made into a predetermined size (thickness: 1.8 mm, width: 25 mm, length: 26 mm).

(2) A hot plate was prepared, and a force gauge ("ZTA-500N" manufactured by Makita Corporation) was disposed at a position 1.2 cm away from the surface of the hot plate. A plate-like jig having a diameter of 1.6 cm (area: 2 cm$^2$) was used.

(3) On the surface of the hot plate heated to 500° C., the sheet-like fire resistant material was placed. Further, on the fire resistant material, a ceramic plate (made of calcium silicate, thickness: 2 mm, width: 30 mm, length: 30 mm) was disposed.

(4) The maximum stress measured by the force gauge when the fire resistant material was heated at 500° C. for 250 seconds on the hot plate was divided by the area of the jig, and the quotient was defined as the expansion pressure.

(II) Expansion Ratio

The expansion ratio was obtained as follows. The fire resistant material in Examples and Comparative Examples each was made into a predetermined size (thickness: 1.8 mm, width: 25 mm, length: 25 mm). The fire resistant material having the predetermined size was set on the base of a stainless steel plate (98 mm square, thickness: 0.3 mm) and supplied into an electric furnace to be heated at 600° C. for 30 minutes. The thickness of the fire resistant material after heating was divided by the thickness of the fire resistant material before heating to obtain the expansion ratio.

(III) Fire Resistive Period

A door component for evaluation of fire resistive period, composed of a door made of calcium silicate plates (manufactured by Nippon Insulation Co., Ltd.) and a door frame, was made. There exists a 1 cm gap between the side face of the door and the door frame of the door component for evaluation of fire resistive period. To the side face of the door, a fire resistant material in Examples and Comparative Examples each made into a predetermined size (thickness: 1.8 mm, width: 25 mm, length: 1000 mm) was fixed. Subsequently, the sample was subjected to heating in a refractory furnace according to the standard heating curve specified in ISO 834 so as to measure the time until the fire resistant material flaked off. The longer the time until the fire resistant material flakes off, the more excellent fire resistance the fire resistant material has. The evaluation was performed based on the following criteria.

A: time until the fire resistant material flakes off of 90 minutes or more

B: time until the fire resistant material flakes off of 75 minutes or more and less than 90 minutes C: time until the fire resistant material flakes off of 60 minutes or more and less than 75 minutes D: time until the fire resistant material flakes off of less than 60 minutes (IV) Formability In kneading with a roll, a too hard material has no fluidity, while a too soft material loses shape retention due to excessive fluidity, which result in a poor yield.

The formability was determined based on the yield of the product in a sheet shape obtained after kneading of the inputted material.

A: 90% or more

B: 70% or more and less than 90%

C: 50% or more and less than 70%

D: less than 50%

(V) Viscosity

A mixture including the polyvinyl chloride based resin and the plasticizer contained in the fire resistant material at a mixing ratio equal to the compounding ratio in the fire resistant material in Examples and Comparative Examples each was kneaded at 150° C., and then pressed at 130° C. to produce a sheet-like sample having a thickness of 1.8 mm. The sheet was then cut into a circle having a diameter of 20 mm, which was subjected to measurement of viscosity at 300° C. with a rheometer ("Mars III" manufactured by HAAKE) under the following conditions.

Measurement temperature range: 50 to 400° C.

Temperature rise rate: 10° C./min

Strain frequency: 10 Hz (VI) Appearance of Wound Product

After the fire resistant multilayer sheet made in Examples and Comparative Examples each was wound on a roll, the wound fire resistant multilayer sheet was flattened to cut out a test piece having a length of 1 m. The appearance of the test piece was rated as "A" when no wrinkles and no peeling were visually observed in the base material and the separator at all, "B" when wrinkles or peelings were visually observed at 1 to 5 spots in the base material and the separator, "C" when wrinkles or peelings were visually observed at 6 to 10 spots in the base material and the separator, and "D" when wrinkles or peelings were visually observed at 11 or more spots in the base material and the separator.

(VII) Tensile Elongation of Base Material and Separator

The tensile elongation was obtained in accordance with JIS K 7113. By using AUTOGRAPH (AGS-J, manufactured by Shimadzu Corporation), the sample was pulled at a tension rate of 20 mm/min for measurement of the elongation at break.

(VIII) Adhesion Strength Between Base Material and Fire Resistant Material

The adhesion strength was obtained in accordance with JIS Z 0237. By using AUTOGRAPH (AGS-J, manufactured by Shimadzu Corporation), a peel test at 180° C. was performed under conditions at a tension rate of 100 mm/min for the measurement.

The various components for use in Examples and Comparative Examples each were as follows.

(Thermoplastic Resin)
1. Ethylene-Vinyl Acetate Copolymer (EVA)
    EVA (1) "EV 180" manufactured by Dow-Mitsui Polychemicals Company, Ltd.
        MFR at 190° C.: 0.2 g/10 min
        Vinyl acetate content: 33 mass %
    EVA (2) "EV 260" manufactured by Dow-Mitsui Polychemicals Company, Ltd.
        MFR at 190° C.: 6.0 g/10 min
        Vinyl acetate content: 28 mass %
    EVA (3) "V 422" manufactured by Dow-Mitsui Polychemicals Company, Ltd.
        MFR at 190° ° C.: 0.9 g/10 min
        Vinyl acetate content: 20 mass %
    EVA (4) "EV 550" manufactured by Dow-Mitsui Polychemicals Company, Ltd.
        MFR at 190° C.: 15 g/10 min
        Vinyl acetate content: 14 mass %
2. Polyvinyl Chloride Resin
    PVC (1) "TK 1000" manufactured by Shin-Etsu Chemical Co., Ltd.
        Average polymerization degree: 1000
    PVC (2) "TH-500" manufactured by Taiyo Vinyl Corporation Average polymerization degree: 500
3. Rubber
    Chloroprene 1 "Skyprene TSR-56" manufactured by Tosoh Corporation
        Mooney viscosity ML (1+4) at 100° C.: 70
    Chloroprene 2 "Skyprene 640" manufactured by Tosoh Corporation
        Mooney viscosity ML (1+4) at 100° C.: 85
    SBR "JSR 1500" manufactured by JSR Corporation
    NBR "Nipol 1043" manufactured by Zeon Corporation
    BR "BR-01" manufactured by JSR Corporation (Thermally Expandable Graphite)
    Thermally expandable graphite "ADT 351" manufactured by ADT
        Average aspect ratio: 21.3

(Fire Retardant)
    Aluminum phosphite "APA 100" manufactured by Taihei Chemical Industrial Co., Ltd.
    Ammonium polyphosphate "AP 422" manufactured by Clariant Chemicals
    Ethylene diamine phosphate "AMGARD EDAP" manufactured by AM-GARD, Inc.

(Solid Plasticizer)
    Ethylene-vinyl acetate-carbon monoxide copolymer "Elvaloy 742" manufactured by Du Pont
        Ethylene content: 62 mass %, vinyl acetate content: 28 mass %, carbon monoxide copolymer content: 10 mass %

(Liquid Plasticizer)
    Diisodecyl phthalate "DIDP" manufactured by J-Plus Co., Ltd.
    Adipic acid ether ester based "Adekacizer RS-107" manufactured by Adeka Corporation (Crosslinking Agent)
    Dicumylperoxide "Percumyl D" manufactured by NOF Corporation (Inorganic Filler)
    Calcium carbonate "BF 300" manufactured by Bihoku Funka Kogyo Co., Ltd.
        Average particle size: 8 μm
    Iron oxide, manufactured by Titan Kogyo, Ltd.

(Other Components)
    Processing aid: "P 530" manufactured by Mitsubishi Chemical Corporation
    Processing aid: "CPE 135A" manufactured by Weihai Jinhong
    Processing aid: "Stabinex NT-231" manufactured by Mizusawa Industrial Chemicals, Ltd.

Examples 1 to 11, Comparative Example 1

According to the compounding shown in Table 1, a thermoplastic resin, a thermally expandable graphite, a fire retardant and a crosslinking agent were fed to a roll, and kneaded at 120° C. for 5 minutes to produce a fire resistant resin composition. The resulting fire resistant resin composition was pressed at 100° C. for 3 minutes to produce a sheet-like fire resistant material having a thickness of 1.8 mm. The evaluation results are shown in Table 1.

TABLE 1

| | | | | Example | | | | | | | | | | | Comparative Example |
|---|---|---|---|---|---|---|---|---|---|---|---|---|---|---|---|
| | | | | 1 | 2 | 3 | 4 | 5 | 6 | 7 | 8 | 9 | 10 | 11 | 1 |
| Fire resistant material (part by mass) | Thermoplastic resin | EVA(1)MFR0.2 g/10 min Vinyl acetate content: 33 mass % | EV180 | 100 | 100 | 100 | | | 100 | | | | 100 | 40 | |
| | | EVA(2)MFR6.0 g/10 min Vinyl acetate content: 28 mass % | EV260 | | | | 100 | | | 100 | | | | 30 | |
| | | EVA(3)MFR0.9 g/10 min Vinyl acetate content: 20 mass % | V422 | | | | | 100 | | | 100 | | | | |
| | | EVA(4)MFR15 g/10 min Vinyl acetate content: 14 mass % | EV550 | | | | | | | | | 100 | | 30 | 100 |

TABLE 1-continued

|  |  |  | | Example | | | | | | | | | | | Comparative Example |
|---|---|---|---|---|---|---|---|---|---|---|---|---|---|---|---|
|  |  |  | | 1 | 2 | 3 | 4 | 5 | 6 | 7 | 8 | 9 | 10 | 11 | 1 |
|  | Thermally expandable graphite |  | ADT351 | 120 | 20 | 50 | 120 | 120 | 120 | 120 | 120 | 120 | 120 | 120 | 120 |
|  | Fire retardant | Aluminum phosphite | APA100 | 40 | 40 | 40 | 40 | 40 | 40 | 40 | 40 | 40 |  | 40 | 40 |
|  |  | Ammonium polyphosphate | AP422 |  |  |  |  |  |  |  |  |  | 40 |  |  |
|  | Cross-linking agent | Dicumylperoxide | Percumyl D |  |  |  |  |  | 2 | 2 | 2 | 2 |  | 2 |  |
| Evaluation | Expansion pressure (N/cm²) |  |  | 13.5 | 6.3 | 7.2 | 4.0 | 13.5 | 18.0 | 14.4 | 15.8 | 5.9 | 11.3 | 9.9 | 1.4 |
|  | Fire resistive period |  |  | A | C | C | C | A | A | A | A | C | B | B | D |
|  | Expansion ratio |  |  | 180 | 50 | 100 | 220 | 200 | 175 | 200 | 175 | 200 | 180 | 180 | 200 |
|  | Formability |  |  | B | B | B | A | A | B | A | A | D | B | A | D |

Examples 12 to 20, Comparative Example 2

According to the compounding shown in Table 2, a thermoplastic resin, a thermally expandable graphite, a plasticizer, a fire retardant, an inorganic filler and other components were fed to a roll, and kneaded at 150° C. for 10 minutes to produce a fire resistant resin composition. The resulting fire resistant resin composition was pressed at 130° C. for 3 minutes to produce a sheet-like fire resistant material having a thickness of 1.8 mm. The evaluation results are shown in Table 2.

TABLE 2

|  |  |  |  | | Example | | | | | | | | | Comparative Example |
|---|---|---|---|---|---|---|---|---|---|---|---|---|---|---|
|  |  |  |  | 12 | 13 | 14 | 15 | 16 | 17 | 18 | 19 | 20 | 2 |
| Fire resistant material (part by mass) | Thermoplastic resin | PVC(1) Average polymerization degree: 1000 | TK1000 | 100 | 100 | 100 | 100 | 100 |  | 100 | 100 | 100 | 100 |
|  |  | PVC(2) Average polymerization degree: 500 | TH500 |  |  |  |  |  | 100 |  |  |  |  |
|  | Plasticizer | Solid plasticizer | Elvaloy 742 | 80 | 80 | 80 | 50 | 150 | 80 | 42 | 70 | 80 | 0 |
|  |  | Liquid plasticizer | DIDP | 0 | 0 | 0 | 0 | 0 | 0 | 25 | 5 | 0 | 55 |
|  | Thermally expandable graphite |  | ADT351 | 220 | 20 | 50 | 220 | 220 | 50 | 220 | 220 | 220 | 220 |
|  | Fire retardant | Aluminum phosphite | APA100 | 80 | 80 | 80 | 80 | 80 | 80 | 80 | 80 |  | 80 |
|  |  | Ammonium polyphosphate | AP422 |  |  |  |  |  |  |  |  | 80 |  |
|  | Inorganic filler | Calcium carbonate | BF300 | 8 | 8 | 8 | 8 | 8 | 8 | 8 | 8 | 8 | 8 |
|  | Other components |  | P-530 | 15 | 15 | 15 | 15 | 15 | 15 | 15 | 15 | 15 | 15 |
|  |  |  | CPE135A | 10 | 10 | 10 | 10 | 10 | 10 | 10 | 10 | 10 | 10 |
|  |  |  | Stabinex NT-231 | 3 | 3 | 3 | 3 | 3 | 3 | 3 | 3 | 3 | 3 |
| Evaluation | Viscosity at 300° C. (Pa·s) |  |  | 4200 | 3200 | 3500 | 3000 | 3600 | 1400 | 2400 | 2800 | 4000 | 200 |
|  | Expansion pressure (N/cm²) |  |  | 15.8 | 5.0 | 7.8 | 10.4 | 12.6 | 6.8 | 8.6 | 11.3 | 13.5 | 2.8 |
|  | Fire resistive period |  |  | A | C | C | B | B | C | B | A | A | D |
|  | Expansion ratio |  |  | 170 | 30 | 55 | 180 | 150 | 60 | 160 | 160 | 160 | 180 |
|  | Formability |  |  | B | A | B | C | A | C | A | B | B | A |

Examples 21 to 38, Comparative Example 3

According to the compounding shown in Table 3 and Table 4, a rubber, a thermally expandable graphite, a plasticizer, and a fire retardant were fed to a roll, and kneaded at 150° C. for 10 minutes to produce a fire resistant resin composition. The resulting fire resistant resin composition was pressed at 150° C. for 3 minutes to produce a sheet-like fire resistant material having a thickness of 1.8 mm. The evaluation results are shown in Table 3 and Table 4.

TABLE 3

|  |  |  |  | Example | | | | Comparative Example |
|---|---|---|---|---|---|---|---|---|
|  |  |  |  | 21 | 22 | 23 | 24 | 3 |
| Fire resistant material (part by mass) | Rubber | Chloroprene 1 | Skyprene TSR-56 | 100 | 100 | 100 |  | 100 |
|  |  | Chloroprene 2 | Skyprene 640 |  |  |  | 100 |  |
|  | Plasticizer |  | RS-107 | 25 | 25 | 25 | 25 | 100 |
|  | Thermally expandable graphite |  | ADT351 | 125 | 30 | 60 | 125 | 125 |
|  | Fire retardant | Aluminum phosphite | APA100 | 60 | 60 | 60 | 60 | 60 |
| Evaluation | Expansion pressure (N/cm$^2$) |  |  | 11.7 | 5.4 | 7.2 | 10.8 | 2.3 |
|  | Fire resistive period |  |  | A | C | C | B | D |
|  | Expansion ratio |  |  | 150 | 40 | 60 | 140 | 80 |
|  | Formability |  |  | C | C | C | B | B |

TABLE 4

|  |  |  |  | Example | | | | | | | |
|---|---|---|---|---|---|---|---|---|---|---|---|
|  |  |  |  | 25 | 26 | 27 | 28 | 29 | 30 | 31 | 32 |
| Fire resistant material (part by mass) | Rubber | Chloroprene 1 | Skyprene TSR-56 | 100 | 100 | 100 | 80 | 60 | 40 | 20 | 0 |
|  |  | Chloroprene 2 | Skyprene 640 |  |  |  |  |  |  |  |  |
|  |  | SBR | JSR1500 |  |  |  | 20 | 40 | 60 | 80 | 100 |
|  |  | NBR | Zeon Corporation Nipol1043 |  |  |  |  |  |  |  |  |
|  |  | BR | JSR BR01 |  |  |  |  |  |  |  |  |
|  | Plasticizer |  | RS-107 | 25 | 25 | 25 |  |  |  |  |  |
|  | Thermally expandable graphite |  | ADT351 | 125 | 30 | 60 | 80 | 80 | 80 | 80 | 80 |
|  | Fire retardant | Aluminum phosphite | APA100 |  |  |  | 60 | 60 | 60 | 60 | 60 |
|  |  | Ethylene diamine phosphate | AMGARD EDAP |  |  |  |  |  |  |  |  |
|  | Inorganic filler | Calcium carbonate | Whiton BF-300 | 30 | 30 | 30 |  |  |  |  |  |
|  |  | Iron oxide | Titan Kogyo, Ltd. | 30 | 30 | 30 |  |  |  |  |  |
| Evaluation | Expansion pressure (N/cm$^2$) |  |  | 12.5 | 6.1 | 7.8 | 9.3 | 9.2 | 9.4 | 9.6 | 9.8 |
|  | Fire resistive period |  |  | A | C | C | B | B | B | B | B |
|  | Expansion ratio |  |  | 160 | 50 | 70 | 110 | 110 | 120 | 120 | 130 |
|  | Formability |  |  | A | A | A | B | B | A | A | A |

|  |  |  |  | Example | | | | | |
|---|---|---|---|---|---|---|---|---|---|
|  |  |  |  | 33 | 34 | 35 | 36 | 37 | 38 |
| Fire resistant material (part by mass) | Rubber | Chloroprene 1 | Skyprene TSR-56 | 40 | 20 | 0 |  |  |  |
|  |  | Chloroprene 2 | Skyprene 640 |  |  |  | 100 |  |  |
|  |  | SBR | JSR1500 | 60 | 80 | 100 |  |  |  |
|  |  | NBR | Zeon Corporation Nipol1043 |  |  |  |  | 100 |  |
|  |  | BR | JSR BR01 |  |  |  |  |  | 100 |
|  | Plasticizer |  | RS-107 |  |  |  | 25 |  |  |
|  | Thermally expandable graphite |  | ADT351 | 80 | 80 | 80 | 125 | 125 | 125 |

TABLE 4-continued

|  |  |  |  |  |  |  |  |  |
|---|---|---|---|---|---|---|---|---|
| Fire retardant | Aluminum phosphite | APA100 |  |  |  |  | 60 |  |
|  | Ethylene diamine phosphate | AMGARD EDAP |  |  |  | 60 |  | 60 |
| Inorganic filler | Calcium carbonate | Whiton BF-300 | 30 | 30 | 30 |  |  |  |
|  | Iron oxide | Titan Kogyo, Ltd. | 30 | 30 | 30 |  |  |  |
| Evaluation | Expansion pressure (N/cm²) |  | 11.8 | 12.1 | 12.3 | 11.9 | 11.5 | 9.0 |
|  | Fire resistive period |  | A | A | A | A | A | B |
|  | Expansion ratio |  | 150 | 150 | 160 | 150 | 150 | 150 |
|  | Formability |  | A | A | A | C | A | A |

As shown in Examples described above, it has been found that the fire resistant material containing a matrix resin and a thermally expandable graphite, with an expansion pressure equal to or more than a specified value, has excellent fire resistance due to a long fire resistive period.

In contrast, it has been found that the fire resistant material in Comparative Examples each having an expansion pressure of less than a specified value has poor fire resistance due to a short tire resistive period.

Examples 39 to 47

A fire resistant resin composition for forming the fire resistant material in Example 1 shown in Table 1 was fed into a single screw extruder, extruded at 150° C., and laminated on a base material shown in Table 5 fed from a roll, so that a laminate including a base material and a fire resistant material having a thickness shown in Table 5 was formed. Subsequently, a laminate including an acrylic based adhesive layer having a thickness of 100 μm formed on a separator shown in Table 5 and the laminate including the base material and the fire resistant material were laminated such that the fire resistant material and the acrylic based adhesive layer came into contact with each other, and hot pressed. The resulting fire resistant multilayer sheet was wound on a roll, and subjected to evaluation and measurement of each of the properties described above. The results are shown in Table 5.

TABLE 5

|  |  | Example 39 | Example 40 | Example 41 | Example 42 | Example 43 | Example 44 | Example 45 | Example 46 | Example 47 |
|---|---|---|---|---|---|---|---|---|---|---|
| Base material | Type | PVC1 | PVC3 | PVC4 | PET1 | PVC2 | PVC1 | PVC2 | PVC2 | PVC2 |
|  | Thickness (μm) | 200 | 50 | 350 | 200 | 200 | 200 | 200 | 200 | 200 |
|  | Thickness relative to fire resistant multilayer sheet (%) | 10.0 | 2.7 | 16.3 | 10.0 | 9.2 | 9.2 | 10.0 | 9.5 | 9.9 |
|  | Tensile elongation (%) | 80 | 25 | 6 | 20 | 40 | 80 | 40 | 40 | 40 |
|  | Adhesive strength to fire resistant material (N/10 mm) | 150 | 80 | 70 | 20 | 58 | 140 | 60 | 83 | 72 |
| Fire resistant material |  | Example 1 | Example 1 | Example 1 | Example 1 | Example 1 | Example 1 | Example 1 | Example 1 | Example 1 |
| Thickness of fire resistant material (μm) |  | 1675 | 1675 | 1675 | 1675 | 1675 | 1675 | 1675 | 1675 | 1675 |
| Thickness of adhesive layer (μm) |  | 100 | 100 | 100 | 100 | 100 | 100 | 100 | 100 | 100 |
| Separator | Type | PET1 | PET1 | PET1 | PET1 | PET3 | PET2 | PP1 | PP2 | Paper 1 |
|  | Thickness (μm) | 25 | 25 | 25 | 25 | 200 | 10 | 30 | 120 | 50 |
|  | Thickness relative to fire resistant multilayer sheet (%) | 1.25 | 1.35 | 1.16 | 1.25 | 9.20 | 0.50 | 1.50 | 5.73 | 2.47 |
|  | Tensile elongation (%) | 50 | 50 | 50 | 50 | 130 | 10 | 30 | 150 | 4 |
| Thickness of fire resistant multilayer sheet (μm) |  | 2000 | 1850 | 2150 | 2000 | 2175 | 2175 | 2005 | 2095 | 2025 |
| Properties of fire resistant multilayer sheet/Appearance of wound product |  | A | A | A | A | B | A | A | B | B |

Incidentally, the following were used as the base material, the adhesive layer and the separator in Table 5.

[Base Material]

PVC1: polyvinyl chloride film (thickness: 200 μm), manufactured by Achilles Corporation, with corona treatment on one side PVC2: polyvinyl chloride film (thickness: 200 μm), manufactured by Nippon Carbide Industries Co., Ltd., without corona treatment PVC3: polyvinyl chloride film (thickness: 50 μm), manufactured by Nippon Carbide Industries Co., Ltd., without corona treatment PVC4: polyvinyl chloride film (thickness: 350 μm), manufactured by Nippon Carbide Industries Co., Ltd., without corona treatment PET1: polyethylene terephthalate film (thickness: 200 μm), "Crisper" manufactured by Toyobo Co., Ltd., without corona treatment

[Adhesive Layer]

Acrylic based adhesive: "SKDyne" manufactured by Soken Chemical & Engineering Co., Ltd.

[Separator]

PET1: polyethylene terephthalate film (thickness: 25 μm), "Crisper" manufactured by Toyobo Co., Ltd.

PET2: polyethylene terephthalate film (thickness: 10 μm), "Crisper" manufactured by Toyobo Co., Ltd.

PET3: polyethylene terephthalate film (thickness: 200 μm), "Crisper" manufactured by Toyobo Co., Ltd.

PP1: polypropylene film (thickness: 30 μm), manufactured by Futamura Chemical Co., Ltd.

PP2: polypropylene film (thickness: 120 μm), manufactured by Futamura Chemical Co., Ltd.

Paper 1: release paper (thickness: 50 μm), "Sumilease" manufactured by Sumika-kakoushi Co., Ltd.

As the separator for all of the above, one having a surface to be in contact with an adhesive layer, release treated with a fluorine based resin release agent, was used.

As shown in Examples each, the fire resistant multilayer sheet includes a base material, a fire resistant material disposed on one side of the base material, an adhesive layer disposed on the opposite side of the side of the fire resistant material on which the base material is disposed, and a separator, having a thickness of the base material and the separator relative to the fire resistant multilayer sheet in a specific range. Even when the fire resistant multilayer sheet is bent, peeling between the base material and the fire resistant material and peeling between the fire resistant material and the separator were prevented, and wrinkles hardly occurred on the base material and the separator, so that the appearance of the fire resistant multilayer sheet usable as building material was maintained well.

REFERENCE SIGNS LIST

1: Base Material, 2: Fire Resistant Material, 3,3': Adhesive Layer. 4,4': Separator. 5, 5': Path

The invention claimed is:

1. A thermally expandable fire resistant material comprising a thermoplastic resin, a thermally expandable graphite and a fire retardant, and having an expansion pressure of 3.0 N/cm$^2$ or more,
wherein the thermoplastic resin is an ethylene-vinyl acetate copolymer,
wherein the ethylene-vinyl acetate copolymer comprises a high-Vac component having a vinyl acetate content of 20 mass % or more,
wherein the fire retardant comprises an aluminum phosphite,
wherein the content of the fire retardant relative to 100 parts by mass of the ethylene-vinyl acetate copolymer is 30 to 100 parts by mass, and
wherein the content of the thermally expandable graphite relative to 100 parts by mass of the ethylene-vinyl acetate copolymer is 50 to 300 parts by mass.

2. The thermally expandable fire resistant material according to claim 1, wherein the content of the thermally expandable graphite is 80 to 150 parts by mass relative to 100 parts by mass of the thermoplastic resin.

3. The thermally expandable fire resistant material according to claim 1, wherein the ethylene-vinyl acetate copolymer comprises a low-MFR component having a melt flow rate (MFR) at 190° C. of 8.0 g/10 min or less.

4. The thermally expandable fire resistant material according to claim 1, further comprising a crosslinking agent.

5. The thermally expandable fire resistant material according to claim 1, wherein the fire retardant further comprises one or more selected from the group consisting of a metal phosphate, a metal phosphite other than the aluminum phosphite, and an ethylenediamine phosphate.

\* \* \* \* \*